(12) United States Patent
Lo et al.

(10) Patent No.: US 6,355,922 B1
(45) Date of Patent: Mar. 12, 2002

(54) IMAGING SYSTEM AND METHOD FOR HARDBODY DETECTION AND SENSOR FIXED ARTIFACT REJECTION

(75) Inventors: Thomas K. Lo; Stephen M. Jensen, both of Tucson, AZ (US)

(73) Assignee: Raytheon Company, Lexington, MA (US)

( * ) Notice: Subject to any disclaimer, the term of this patent is extended or adjusted under 35 U.S.C. 154(b) by 0 days.

(21) Appl. No.: 09/332,822

(22) Filed: Jun. 14, 1999

(51) Int. Cl.[7] ............................................. H01L 27/00

(52) U.S. Cl. .................. 250/208.1; 250/214 R

(58) Field of Search .................. 250/208.1, 214 R, 250/214 P, 559.22; 358/530, 448, 452; 382/203, 195; 356/376, 379

(56) References Cited

U.S. PATENT DOCUMENTS 4,972,260 A * 11/1990 Fujikawa et al. ........... 358/136

* cited by examiner

*Primary Examiner*—Que T. Le
(74) *Attorney, Agent, or Firm*—Colin M. Raufer; Glenn H. Lenzen, Jr.; Andrew J. Rudd

(57) ABSTRACT

A system and method of finding a detection threshold that separates real scene objects seen through an optical system from sensor fixed artifacts. The inventive system continuously scans the sensor so that objects in the scene move in an inverse sense relative to the scanning motion while fixed frame artifacts remain fixed in focal plane coordinate system. The difference in temporal behavior is used to discriminate against fixed frame artifacts. The inventive system finds a detection threshold that maximizes the portion of a target that may be segmented while avoiding setting the threshold so low that it merges spatially adjacent artifacts in with the target.

5 Claims, 2 Drawing Sheets

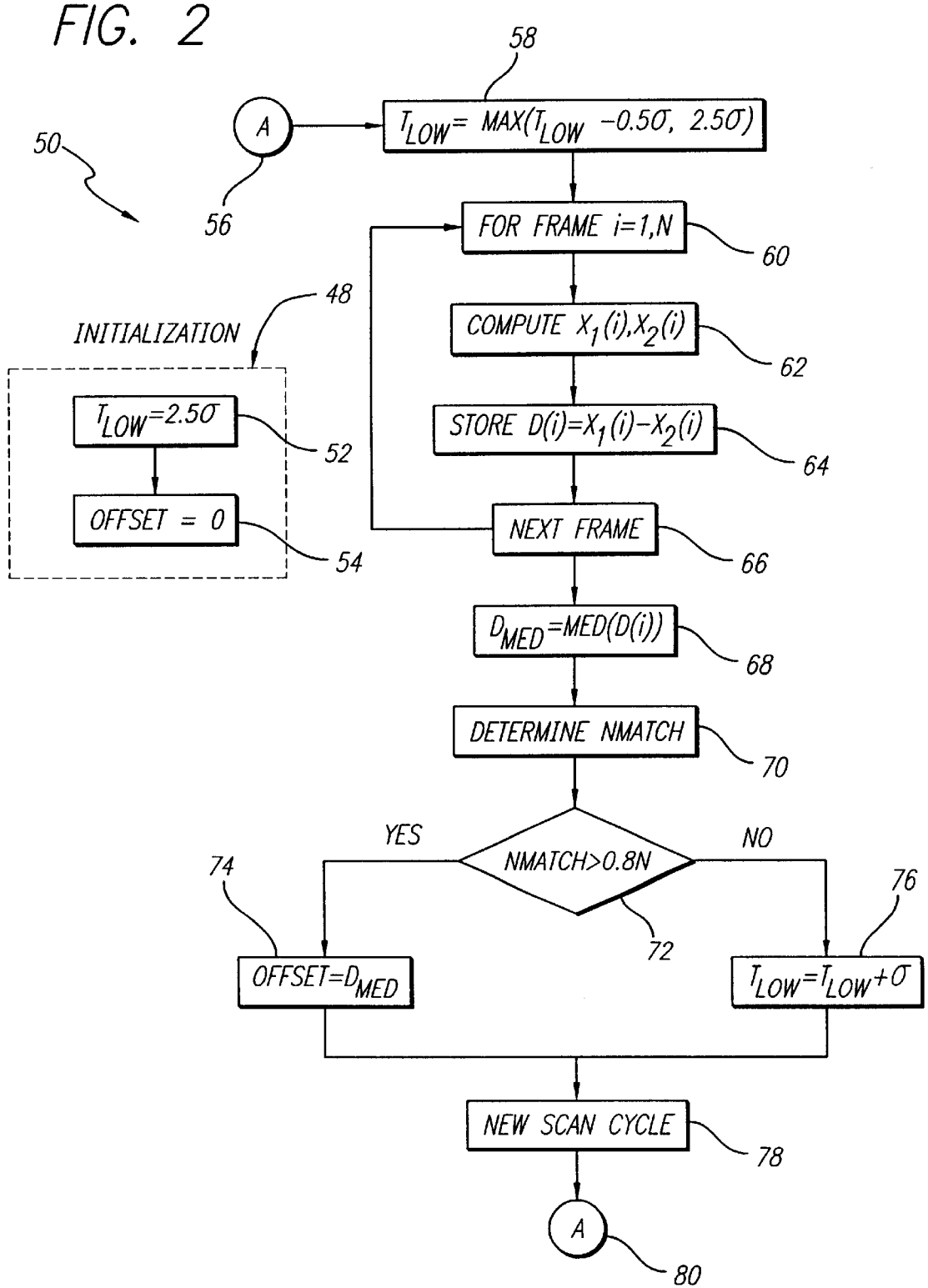

IMAGING SYSTEM AND METHOD FOR HARDBODY DETECTION AND SENSOR FIXED ARTIFACT REJECTION

BACKGROUND OF THE INVENTION

1. Field of the Invention

The present invention relates to imaging systems. More specifically, the present invention relates to systems and methods for finding detection thresholds in infrared imaging systems that separate real scene objects observed through an optical system from sensor fixed artifacts.

2. Description of the Related Art

Infrared image sensors are used in military, astronomical and other applications. For example, in military applications, infrared image sensors are often used for target acquisition and tracking. The seekers of missiles often use arrays of image detectors sensitive to energy in the visible or (more typically) infrared portion of the electromagnetic spectrum. Unfortunately, these arrays, referred to as focal plane arrays are subject to anomalies such as detector to detector nonuniformity in sensitivity and gain and fixed pattern noise. While numerous techniques are known in the art for addressing detector to detector nonuniformity in sensitivity and gain, fixed pattern noise continues to be problematic.

Fixed pattern noise (FPNs) are sensor fixed artifacts induced by non-uniform response of the focal plane array (FPA). The non-uniform response causes the FPA output to be spatially varying even when illuminated by a uniform source.

That is, when viewed through an infrared imager, many objects (for example, airplanes, vehicles, building, etc) consist of several regions which are locally homogeneous in intensity. The process of finding those pixels in an image which correspond to an object is called 'segmentation'. For purposes of guiding a vehicle to an object, one needs to locate the position of the object in the image and provide this position to a guidance and control system at a specified (high) data rate and within a predefined time interval (latency requirement). Segmentation of the object is performed on the image to define the object. The centroid of the segmented object is then reported as the position of the object.

Frequently, one or more of the regions on an object has high contrast and can be easily detected (segmented). The centroid of these detected regions can be used for guidance purposes. As stated earlier, these positions must be reported at high data rate. For the purposes of guidance, it is sufficient to guide to a high contrast region on the object. It is often desirable to find the centroid of the entire object (or as much of it as possible) as the guidance point. To accomplish this, it is necessary to segment the entire object. As long as the high contrast regions are being found at a sufficiently high data rate to satisfy guidance, there is no data rate requirement on segmenting the entire object because it is not used for guidance. Once a larger portion of the object has been segmented, the guidance system is told to shift its guidance point on the centroid of the entire object. Thus, the process of segmenting out the entire object may take many image frames.

The detection of the high contrast regions may be easily accomplished with a high detection threshold. With a high detection threshold, there is little likelihood of segmenting out pixels that belong to the background and linking them to the object of interest. To detect the lower contrast regions of an object, it is necessary to lower the detection threshold. When the detection threshold is lowered, it is possible that background pixels adjacent to the object may also exceed the detection threshold. Because all threshold pixels that are spatially touching (either 4 connected or 8 connected as known to those skilled in the art) are considered as one object, too low a threshold then causes the object to merge with the background and may lead to a centroid that is not on the object of interest. Providing the centroid of the merged object/background to guidance will then cause a miss.

The question to be addressed is this, how can the threshold be set to be low enough to detect the lower contrast regions of the object of interest without simultaneously setting the threshold so low that it merges adjacent background in with the object. Of course, the contrast of portions of the object may be so low that it is not possible to segment all of the regions without merger. In this case, the objective is to segment as much of the object as possible without segmenting adjacent background pixels.

The conventional technique for object segmentation is based on finding a threshold that leads to a stable area. That is, the threshold is changed until a derivative of the area segmented with respect to threshold is essentially zero. The principle of this method assumes that that there is a significant difference in grey level between the object of interest (the target) and its adjacent regions in the image. Hence, once the threshold reaches the correct value, further decreases in the threshold (assuming the target is brighter than its neighbors) does not lead to further increases in area.

Unfortunately, the conventional technique for object segmentation fails to include all of the target when it is made up of multiple locally homogeneous regions because it will segment only one local region. In addition, when adjacent regions have similar grey levels as the target due to image artifacts and has been included in the segmentation, there is no method of rejection.

Hence, a need remains in the art for a system and method for object segmentation for example, in infrared image when sensor fixed artifacts are present. More specifically, there is a need in the art for a system and method for segmenting as much of the target as possible without merging other objects in with the target through setting of a threshold that is too low.

SUMMARY OF THE INVENTION

The need in the art is addressed by the present invention which provides A system and method of finding a detection threshold that separates real scene objects seen through an optical system from sensor fixed artifacts. The inventive system continuously scans the sensor so that objects in the scene move in an inverse sense relative to the scanning motion while fixed frame artifacts remain fixed in focal plane coordinate system. The difference in temporal behavior is used to discriminate against fixed frame artifacts. The inventive system finds a detection threshold that maximizes the portion of a target that may be segmented while avoiding setting the threshold so low that it merges spatially adjacent artifacts in with the target.

In the illustrative embodiment, the inventive system includes a scanning sensor for providing a video signal comprising plural image frames representative of a scene having a rigid body therein. The system uses first circuit to detect a first region of high contrast in the scene using a high threshold and calculates a first centroid in response thereto. A second circuit is used to detect a second region using a low threshold and to calculate a second centroid in response thereto. The centroids are compared and a difference vector is calculated therebetween. The difference vector is analyzed over plural image frames and to segment a larger region of the rigid body than that afforded using conventional teachings. If the difference vector remains substantially unchanged over a predetermined number of image frames a lower threshold is set. The process is performed periodically to grow the segmented pixels to the object in its entirety.

BRIEF DESCRIPTION OF THE DRAWINGS

FIG. 2 is a flow diagram of the illustrative implementation of the hardbody detection and sensor fixed artifact rejection method of the present invention.

DESCRIPTION OF THE INVENTION

Figure 1:
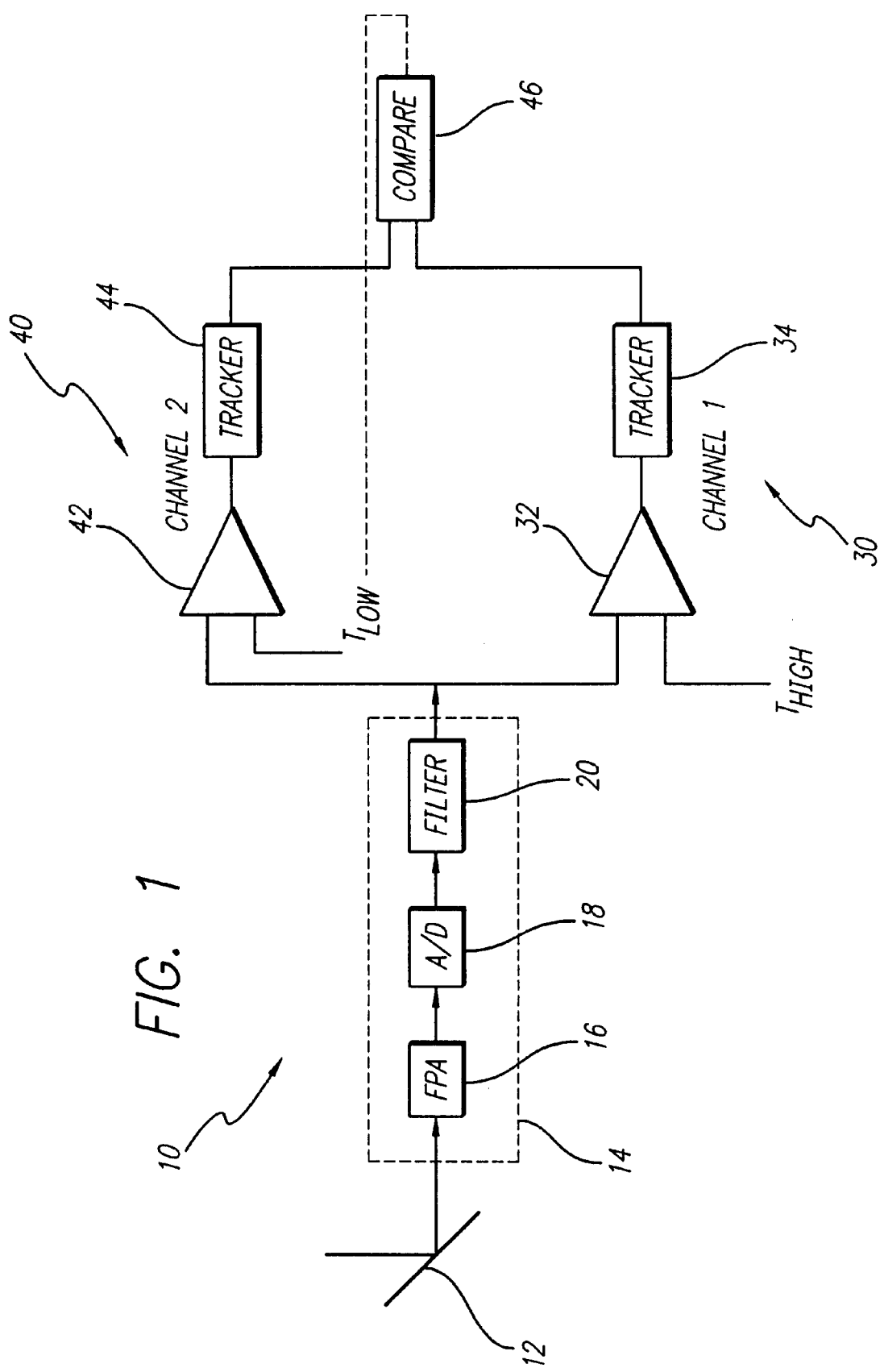
FIG. 1 is a block diagram of an infrared video processing system constructed in accordance with the teachings of the present invention.

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

The present invention is based on rigid body behavior and relative motion between moving objects. Different portions of the same object obey a rigid body relationship and therefore move together. On the other hand, objects that are moving relative to each other will see the vector formed by the difference between their centroids change with time. When the object of interest is a real object imaged from the scene, relative motion between the object and fixed frame artifacts may be induced by scanning the sensor. By detecting the high contrast region with a high threshold, its centroid can serve as a reference point. Using a lower trial threshold, a larger region is segmented. The difference vector formed by the centroid of the larger region relative to the centroid of the high contrast region is formed. If the difference vector remains the same over many images as the sensor is scanned, then the larger region and the reference region are part of the same rigid body. The trial threshold is accepted and a new lower trial threshold is formed. If the trial threshold is too low, so that the sensor fixed artifacts are merged with the object, then the centroid of the larger segmented region will move relative to the centroid of the reference region. Consequently, the difference vector will change over many frames. In this case, the lowest useable threshold is the previous threshold. In this way, the lowest threshold which results in segmentation of the largest portion of the object is found. The process is performed periodically to grow the segmented pixels to the object in its entirety.

FIG. 1 is a block diagram of an infrared video processing system constructed in accordance with the teachings of the present invention. The system 10 includes an optical system 11 which focuses infrared, visible or other electromagnetic energy (depending on the implementation) onto a camera 14. As is common in the art, a mirror 12 is located on a gimbaled platform (not shown) and is used to scan the image continuously. The amount of displacement per image frame is controlled by a tracker as discussed more fully below.

In the illustrative embodiment, the camera 14 includes a focal plane array (FPA) 22 of image detectors. The video signal output by the FPA 22 is digitized by an analog-to-digital (A/D) converter 18 and input to a high pass spatial filter 20. The filter suppresses low frequency background and enhances signal to noise ratio. No particular form of spatial filtering is assumed in the present invention because particular forms of spatial filtering is not critical to this invention.

The filtered signal is split off into two channels: Channel 1 uses a high detection threshold to find high contrast regions of the object and is performed in real time to support guidance. Channel 2 is used to hunt for the low level threshold required to detect the total object. For the remainder of this disclosure, Channel 1 is called the reference channel. Each Channel 30 and 40 includes a thresholder 32, 42 and a tracker 34, 44, respectively. Within each Channel the detections are sent to the associated tracker to correlate detections with tracks formed from prior detections. Trackers are well known to those skilled in the art. Any one of many existing trackers may be utilized in the present invention. The outputs of the trackers are compared in a processor 46 to implement the method of the present invention as discussed more fully below.

FIG. 2 is a flow diagram of the illustrative implementation of the hardbody detection and sensor fixed artifact rejection method of the present invention. In the flow diagram 50 of FIG. 2 the method of the present invention is illustrated for determining the appropriate value of the low threshold $T_{low}$ for each scan cycle. To understand the operation of the present invention, assume that a high contrast region has been acquired and is tracked in the reference Channel using the high threshold $T_{high}$. The process of selecting a threshold, $T_{low}$ for Channel 2 is described below. The scanning motion of the mirror 12 is a nutation with a period of N frames (e.g., N=10 to 16 frames). The displacement from frame-to-frame should be selected to be large relative to the measurement uncertainty of the position of the centroid.

At step 48, the beginning of processing, a quantity called the centroid offset is initialized to 0. At the start of each cycle, $T_{low}$ is initialized to its present value minus the larger of 1 count or one half times the standard deviation of the noise but limited to a preset minimum value equal to the larger of 1 count or 2 times the standard deviation of the noise. For example, $T_{low}$ may be initialized to the larger of 2.5 times the standard deviation of the noise and 1 count. At step 62, on each frame (frame i) during the scan cycle, the centroid for each Channel is computed. The centroids for channels 1 and 2 are designated as $X_1$ and $X_2$, respectively. The vector difference between the two centroids on the ith frame is computed as:

$$D(i)=X_1(i)-X_2(i) \quad (1)$$

At step 64, the N vector differences are stored for the entire cycle. At the end of each scan cycle (step 68), the median value of the N vectors D(i) is formed and is denoted $D_{med}$. If the regions segmented by the two thresholds belong to a common rigid body, the difference vector between the two centroids should be a constant. If the object segmented in Channel 2 includes sensor fixed artifacts, then the difference vector on the ith frame will be a fixed constant plus the cumulative displacement due to scanning from frame 1 through frame i and hence take on different values for different frames. The absolute difference between D(i) and the median value, D(i)–$D_{med}$, is compared to a threshold set to some multiple times the centroid measurement uncertainty (e.g. 2.5 times the measurement uncertainty). The number of elements whose absolute difference relative to the median is less than the threshold is accumulated (step 70). This value is called 'Nmatch' and represents the number of frames where the two centroids move together rigidly with a relative displacement equal to $D_{med}$.

At step 72, Nmatch is compared to a threshold value. If Nmatch is greater than the threshold value, for example, if Nmatch is greater than 0.8 N (80% of the frames in a scan cycle is within tolerance), then the region segmented in Channel 2 may be accepted as having a rigid body relation with the region segmented by the reference channel. In this case, the centroid of Channel 2 may be accepted as a better track point than the centroid of Channel 1. Accordingly, at step 74, the value $D_{med}$ is stored as the new centroid offset. In all subsequent frames, the position of the track point sent to guidance will be $X_1$ plus the centroid offset. At step 78, a new scan cycle is restarted to hunt for a better value of $T_{low}$ appropriate to the current scene.

If, at step 72, Nmatch is less than 0.8 N, then the Channel 2 object does not obey a rigid body relation relative to the object segmented by the reference channel. In this case, at step 76 the value for $T_{low}$ is incremented by the larger of 1 count or the standard deviation of the noise. A new scan cycle is restarted to hunt for a better value of $T_{low}$.

In this manner, the invention endeavors to find the lowest possible value of $T_{low}$ consistent with maintaining a rigid body with respect to the object segmented reference channel. By demanding Nmatch equal to 0.8 N as oppose to N, it allows for incidental merger transiently for a few frames during the scan (the object happens to overlay artifacts on these frames but cannot be continuously merged over the entire scan). By continuing to search for $T_{low}$ even after an appropriate value has been found, it allows for threshold adjustment to accommodate changes in object intensity and time varying values of the adjacent background. Finally, adding the centroid offset to the reference Channel centroid allows the system to guide toward the best aimpoint (i.e. the centroid of the largest piece of the segmented object) while maintaining merger immunity, high data rate, and low latency by tracking with the reference channel.

While the current invention describes how to find a detection threshold which discriminates against sensor fixed artifacts, the principle of using rigid body relation to find a consistent threshold is equally applicable to the problem of avoiding merger with spatially adjacent clutter that moves relative to the object of interest. The difference is that in the sensor fixed artifact case, relative motion is induced and controlled by sensor scanning whereas in the clutter case, relative motion is naturally occurring and not controllable.

Thus, the present invention has been described herein with reference to a particular embodiment for a particular application. Those having ordinary skill in the art and access to the present teachings will recognize additional modifications applications and embodiments within the scope thereof.

It is therefore intended by the appended claims to cover any and all such applications, modifications and embodiments within the scope of the present invention.

Accordingly,

What is claimed is:

1. An imaging system comprising:

a scanning sensor for providing a video signal comprising plural image frames representative of a scene having a rigid body therein;

first thresholding means for detecting a first region of high contrast in said scene using a first threshold and calculating a first centroid in response thereto;

second thresholding means for detecting a second region using a second threshold and calculating a second centroid in response thereto;

third means for calculating a difference vector between said first centroid and said second centroid; and fourth means for analyzing the difference vector over said plural image frames and identifying said rigid body in response thereto.

2. The invention of claim 1 wherein said scanning sensor is an infrared sensor.

3. The invention of claim 1 further including means for setting a lower second threshold if the difference vector remains substantially unchanged over a predetermined number of image frames.

4. An imaging method comprising the steps of:

providing a video signal comprising plural image frames representative of a scene having a rigid body therein;

detecting a first region of high contrast in said scene using a first threshold and calculating a first centroid of in response thereto;

detecting a second region using a second threshold and calculating a second centroid in response thereto;

calculating a difference vector between said first centroid and said second centroid; and analyzing the difference vector over said plural image frames and identifying said rigid body in response thereto.

5. The invention of claim 4 further including the step of setting a lower second threshold if the difference vector remains substantially unchanged over a predetermined number of image frames.

* * * * *